United States Patent [19]

Tewfik

[11] 4,417,232
[45] Nov. 22, 1983

[54] LIQUID VOLUME INDICATOR

[76] Inventor: Farouk F. Tewfik, 33C Forest Dr., Garnerville, N.Y. 10923

[21] Appl. No.: 29,978

[22] Filed: Apr. 16, 1979

[51] Int. Cl.³ .................. B60Q 1/00; G01F 23/00; G08B 21/00
[52] U.S. Cl. ..................... 340/59; 73/298; 73/303; 200/83 Z; 340/614
[58] Field of Search ........... 340/59, 521, 614, 611, 340/626, 52 R, 54, 60, 625; 73/298, 302, 303; 200/81 H, 81.6, 83 A, 83 B, 83 C, 83 Z; 335/219

[56] References Cited

U.S. PATENT DOCUMENTS

| | | | |
|---|---|---|---|
| 1,560,343 | 11/1925 | Foulk | 73/303 |
| 2,043,877 | 6/1936 | Ashworth | 73/298 X |
| 2,547,526 | 4/1951 | Hilliard | 340/515 |
| 2,671,893 | 3/1954 | Van Scoy et al. | 340/618 X |
| 2,724,101 | 11/1955 | Hallman | 340/626 X |
| 2,728,070 | 12/1955 | Kelly | 73/298 X |
| 3,132,331 | 5/1964 | Boddy | 340/59 |
| 3,333,259 | 7/1967 | Carothers, Jr. | 340/614 X |

FOREIGN PATENT DOCUMENTS 733817 4/1943 Fed. Rep. of Germany ........ 73/303

Primary Examiner—John W. Caldwell, Sr.
Assistant Examiner—Daniel Myer
Attorney, Agent, or Firm—Philip Furgang

[57] ABSTRACT

A sensing device for determining the amount of liquid in an oil crankcase of a vehicle. A hollow dipstick, closed at one end and having a metering hole therein, is inserted into the crankcase of a car. The other end of the dipstick is connected by flexible tubing to a suction bellows and a sensing bellows in a sensing module. The suction bellows and sensing bellows are linked together and to the dipstick by branches of a T-tubing. An opposed end of the suction bellows is connected to a piston of a solenoid. The sensing bellows is mounted to move in response to the amount of oil suctioned into the dipstick. An electrical circuit is formed between a push-button, a solenoid, ground and the car battery, such that when the push-button is closed, the solenoid becomes excited, drawing in the piston to thereby expand the suction bellows. Expansion of the suction bellows draws oil into the dipstick. An electrical circuit coupled to the sensing bellows indicates if oil is sampled by the dipstick.

5 Claims, 2 Drawing Figures

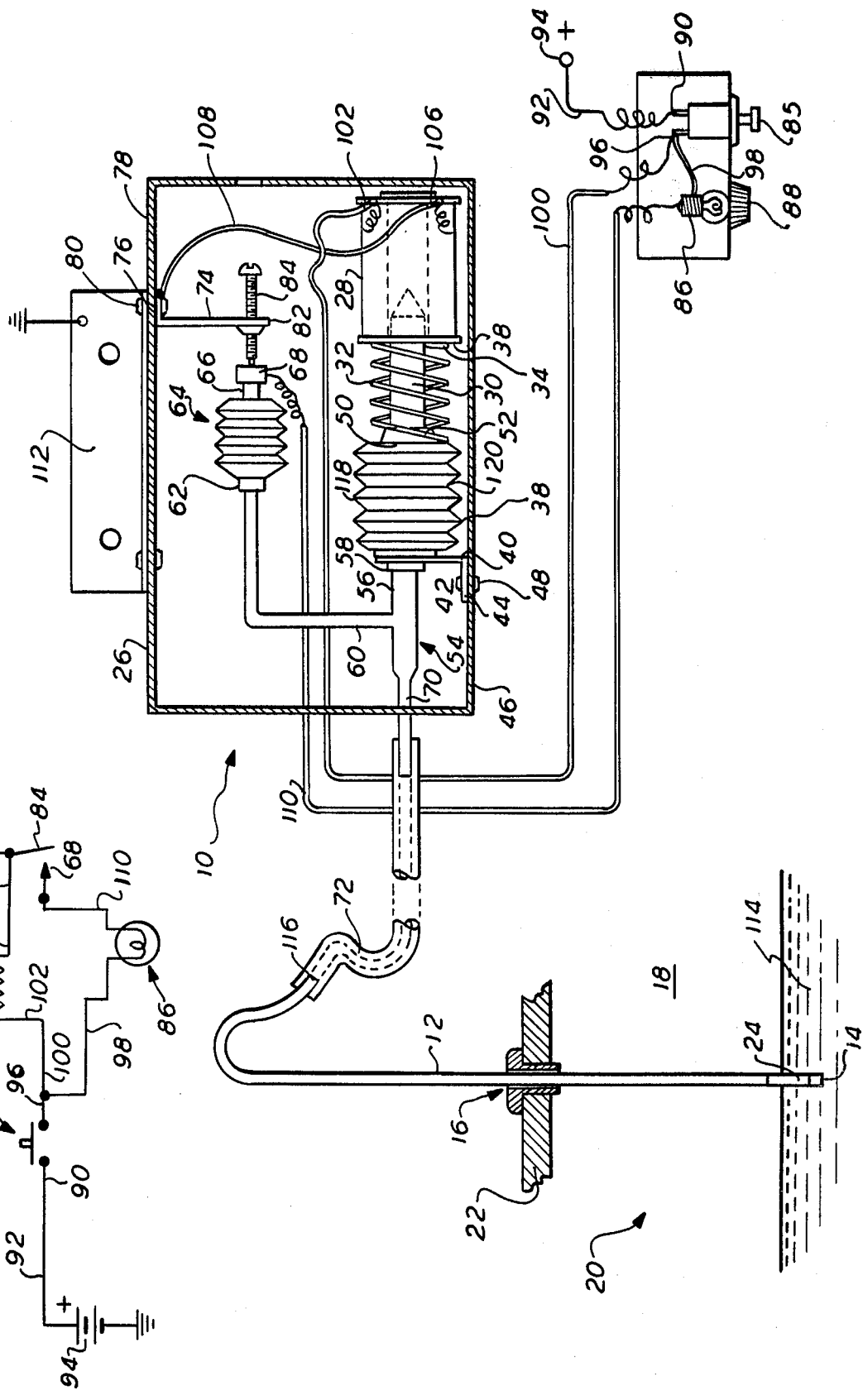

LIQUID VOLUME INDICATOR

BACKGROUND OF THE INVENTION

This invention relates, in general, to devices for indicating the amount of liquid in a container, or the like, and more particularly, to such devices which provide such information by use of a remote indicator.

There are many devices for indicating the level of liquid in a container. The most common, is the common dipstick inserted into the crankcase of an automobile. This measurement is made directly and is messy and inconvenient.

There have been a number of devices suggested for making remote measurements of the level of oil in an automobile. One basic class of devices uses a float. As the float is buoyed up by the oil in the crankcase, means are provided to remotely provide an indication of the oil level. The oil level is used as a measurement of the amount of oil in the crankcase. Such devices have been proposed by Vincent, In U.S. Pat. No. 4,034,608; Van Scoy et al., in U.S. Pat. No. 2,671,893; and Kress, in U.S. Pat. No. 3,953,845.

The disadvantage of float devices is that they are responsive to the angle that the oil assumes in the crankcase. Oil level is, in turn, dependent upon the orientation of the vehicle. Thus, an indication of "low" oil may in fact be a reflection of the position of the vehicle. False indications are possible.

An alternative device has been suggested by Raby in U.S. Pat. No. 2,588,761. Raby provides an oil level indicator in which the dipstick is replaced by a hollow tube of which one end is in the crankcase and the other end communicates with a float chamber. In the float chamber is a float. The float chamber is, in turn, connected to a second hollow tube. This second hollow tube communicates with a valve. The other side of the valve communicates with a vacuum source. A push-button is mechanically linked to the valve. When the push-button is depressed, the vacuum source is connected to the second tube. The vacuum thereupon draws oil up the tube from the crankcase and into the float chamber. The float in the float chamber is mechanically linked to a diaphragm. If sufficient oil is drawn into the float chamber, the float will rise up moving the diaphragm. The diaphragm is connected to an electrical switch. The distortion of the diaphragm causes the closing of the switch and the subsequent lighting of a light indicating sufficient oil. If there is sufficient oil in the float chamber to cause the distortion of the diaphragm, a second light remains on indicating that there is an insufficient amount of oil. The device proposed by Raby is extremely complex involving the use of suction, float, diaphragm, and interrelated electrical contacts. Raby also proposes the use of an intricate valve system and an external vacuum system. Furthermore, measurement is made by the transfer of oil from the crankcase to a second chamber, all of which makes for an exceedingly complicated device with various points of obvious weakness. The drawing of oil to fill a float chamber also is a disadvantage. Such a system mandates a strong suction. This is particularly true when one considers the wide changes of temperature to which an automobile is subject. The changes in temperature have a direct effect on the viscosity of the oil, thereby requiring an extremely strong vacuum for the system to work under all conditions.

Still another device has been proposed by Sherman, in U.S. Pat. No. 2,717,991. In Sherman, a hollow dipstick is connected to a piston slidably moveable within a solenoid coil. When electrical energy is applied to the solenoid coil, the generated magnetic filed causes the piston to move upwardly. At the upper end of the solenoid are a pair of opposed contacts which are normally closed. The contacts are spaced over the axis of the solenoid coil. If air is drawn into the dipstick, the piston moves upwardly, and the contacts are separated. The opening of the contacts causes a break in the current flow to the solenoid. The magnetic field collapses and the piston drops. As soon as the piston drops, the contacts close again causing the solenoid to be activated and the piston to rise sharply again. A light bulb is in series with the solenoid circuit. As a result, the alternating on and off of the solenoid causes a blinking of the light bulb to thereby indicate remotely to the use that the oil in the crankcase of the vehicle is low.

If, instead of air, oil is drawn into the dipstick, the piston will rise slowly. The contacts will remain closed for longer periods of time. The more slowly blinking light bulb is intended to indicate that there is a sufficient quantity of oil.

There are many disadvantages to this device. Sherman measures the rate of flow of the oil into the hollow dipstick. Obviously, there is significant variation in oil viscosity in hot climates as opposed to colder areas. Under conditions of great engine heat or high ambient temperatures, the piston will move much more quickly than in colder climates. This may provide a false indication or lead to an accidental misreading of the blinking light. If the hole in the dipstick is somehow restricted by a partial clogging of the metering hole, a false indication may be given. Still another significant disadvantage is the potential for explosion. Thus, it should be observed that the piston of the Sherman device separates the contacts in the atmosphere of oil vapors. Such separation is likely to cause a spark. Oil fumes, which are obviously highly flammable, may be in the container formed about the Sherman device. Sherman places the bulb across the contacts and employs that as an arc suppressor. However, suppression of an arc may not eliminate a spark at the contacts Such a spark may ignite the oil fumes. A further disadvantage to the Sherman device are the number of variables which determine the accuracy of the indicator. The operation of the device is dependent upon the inertia of the piston, friction between the piston and solenoid coil, changes in the magnetic field as the field is alternately generated and collapsed, moisture, condensed oil vapors, and other foreign matter that may collect on the contacts and piston, the viscosity changes in the oil.

SUMMARY OF THE INVENTION

It is an object of this invention to provide a device which is adapted for mounting on the instrument panel of an automobile to enable the driver to check the oil quantity in a crankcase or the oil quantity in an automatic transmission or the water quantity in a battery or washer container without stopping the engine, lifting the hood, or leaving the driver's seat.

Still another object of this invention is to provide a device which is capable of indicating the quantity of liquid in a container of fixed dimensions which is substantially independent of the angle assumed by the container or the vehicle within which the container may reside.

It is a further object of this invention to provide a device which may measure remotely and by electrical means the quantity of oil or other liquid in a container without such measuring activity igniting any combustible material.

It is a further object of this invention to provide a device which is simple in use and construction, having a minimum number of parts, which may be manufactured and assembled at low cost.

Other objects and advantages of this invention will become more apparent in the course of the following description.

In accordance with the teachings of this invention, there is provided, as indicated, a device for indicating the amount of liquid in a container. This device includes means for receiving a sample of the liquid. Means are also provided for causing the receiving means to receive a sample of the liquid. The causing means is capable of changing gas pressure as a function of the amounts of the liquid sampled. Still other means are provided for responding to the change in gas pressure. This responding means is coupled to the causing means. Finally, means are also provided which are responsive to the responding means for remotely indicating the presence or absence of at least a predetermined amount of liquid received by the receiving means.

A BRIEF DESCRIPTION OF THE DRAWING

FIG. 1 is a mechanical schematic of the device constructed in accordance with the teachings of this invention; and FIG. 2 is an electrical schematic of the device of FIG. 1.

DESCRIPTION OF THE PREFERRED EMBODIMENT

Turning to the drawing, there is disclosed a mechanical schematic (FIG. 1) of the measuring device 10 of this invention. There is provided a dipstick 12 which may be a hollow tubular member closed at one end 14. The dipstick 12 may be made of any rigid material, such as metal or plastic and is so dimensioned as to fit within the opening 16 intended to receive the ordinary dipstick or measuring stick of a crankcase. Thus, in the context of an automobile, the dipstick 12 would be insertable through the dipstick opening 16 and into the interior 18 of a crankcase 20 (part of the engine wall 22 is shown for example purposes only). The dipstick 12 may have a sampling hole 24 adjacent to the closed end 14. The purpose of the sampling hole 24 will be discussed more fully hereinafter.

A housing 26 may be provided for holding the measuring elements of this invention. Thus, the housing 26 may take the form of a rectangular container.

Secured to the interior of the housing 26 may be solenoid 28 of any well-known configuration. About the piston 30 of the solenoid 28 may be a resilient means such as a helical compression spring 32. One end 34 of the spring 32 abuts the end 36 of the solenoid 28 into which the piston 30 moves.

A suction bellows 38 is provided which may be made of any flexible material such a rubber, plastic, or the like. The suction bellows 38 may be secured at one end by means of an L-shaped bracket 40. One leg 42 of the bracket 40 supports the suction bellows 38. The other leg 44 of the bracket 40 may be joined to a wall 46 of the housing 26 by any convenient means such as by a rivet 48. The opposed end 50 of the suction bellows 38 may be held in position by the piston 30 to which it is joined. The juncture of the piston 30 and bellows 38 may be formed by means of a collar 52 into which the piston 30 is fitted. The collar 52 may be closed at one end (not visible) so as to insulate the electrically conductive piston 30 from the interior of the suction bellows 38.

A T-shaped or branched hollow tube 54 may have one end 56 in communication with the suction bellows 38 through its bracket supported end 58. One end 62 of the stem 60 of the tube 54 may communicate with a sensing bellows 64 at one end. The opposed other end 66 of the sensing bellows 64 may be closed and have secured thereto an electrically conductive cap 68. The sensing bellows 64 may be made of the same material as that of the suction bellows 38. The other end 70 of the tube 54 may exit the housing 26 through a conveniently provided aperture. This end 70 of the tubing 54 may be connected by means of a flexible tubing 72 to the dipstick 12. The tube 54 may be made of any rigid nonconductive material, such as glass or plastic, so as to support the sensing bellows 64.

A second L-shaped bracket 74 may have one leg 76 secured to a wall 78 of the housing 26 by any joining means such as a rivet 80 or the like. The other leg 82 of the second bracket 74 may have a screw hole therethrough to which may be secured an electrically conductive screw 84. The screw 84 may be in contact with the electrically conductive cap 68. The bracket 74 is preferably electrically conductive.

At some remote location, for example the dashboard of a vehicle, may be located a push-button switch 85 and a bulb 86, both of which may be secured to the panel, as is well known in the art. The bulb 86 may be disposed in front of an opening in the dashboard to which a lens 88 has been secured.

The push-button switch 85 may be of the type which upon pressing results in the closing of two electrical contacts. One side 90 of the switch 85 may be connected by means of a wire 92 to a car battery (indicated only by a symbol 94). The other side 96 of the switch 85 may be connected by a wire 98 to one side of the bulb 86. Another wire 100 may lead from the side 96 of the switch 85 to one side 102 of the solenoid coil 104 (see FIG. 2).

The other side 106 of the solenoid coil 104 may be connected by means of a wire 108 to the rivet 80 connected to the leg 76 of the second bracket 74. The cap 68 may be connected by means of a wire 110 to the other side of the bulb 86.

In the preferred embodiment, the dipstick 12 may be made of brass and be approximately 14 inches long to reach inside the crankcase. It may have, for example, an outer diameter of ⅛ of an inch and an interior diameter of 1/16 of an inch. The metering hole 24 may have an approximate diameter of 3/64 of an inch and be so disposed as to be within the range of a proper oil level for an automobile.

The flexible hosing 72 may be of any suitable material such as plastic or rubber so as to provide a snug fit at the open end 116 of the hollow dipstick 12 and the connection with the rigid tube 54. It is preferred that the suction bellows 38, in the example provided herein, have an outer diameter of ⅞ of an inch at the furthest extension of its pleating 118 and a smaller pleat 120 diameter of ⅝ of an inch. Fully collapsed, the bellows are preferably ⅜ inch long and fully expanded ⅞ inch long. It is preferred that the sensing bellows 64 be smaller in diameter and axial length than the suction bellows 38. The solenoid 28 may be, for example, a 12 volt 1.7 amp solenoid having a plunger stroke of approximately ½ inch. The rigid T-tube 54 should, for example, provide a snug fit at the openings 56 and 62 in the suction and sensing bellows 38 and 64 respectively and should preferably have an internal diameter of 3/32 inch.

In assembly, the entire box 26 may be secured to a bracket 112 and mounted to the fire wall or the like (not shown) of a vehicle. It is preferred that the bracket 112 and box 26 be provided with the common ground of the vehicle to thereby complete the electrical circuit (FIG. 2). Obviously, the points of connection and grounds are a matter of choice.

In operation, pressing the button 85 closes the contacts 90 and 96 thereby causing current to flow from the battery 94 through wires 92 and wire 100 through the solenoid 104 and line 108 to ground. This causes the piston 30 of the solenoid 28 to be pulled in. The effect of pulling in compresses the spring 32 and enlarges the suction bellows 38 thereby creating a partial vacuum or reduced gas pressure in the tube 54, flexible tubing 72 and dipstick 12. If the metering hole 24 is below the level of oil 114, oil will enter the metering hole 24 and be drawn up into the tube. In the preferred embodiment, the oil may be expected to rise approximately 5 inches above the level of the sampling hole 24 and held at this level. (The exact height is not significant.) As this occurs, the suction bellows 38 will draw the gas, preferably air, through the tube 54 from the sensing bellows 64. Since the sensing bellows 64 is freely secured at its end 62 to the stem 60 of the T-tube 54, the bellows 64 will be caused to collapse toward the tube 60, thereby drawing the cap 68 out of contact with the screw 84. The circuit (FIG. 2) will open, thereby causing the light bulb 86 to go out. If the dipstick 12 draws air instead, due to an insufficient amount of oil 114 in the crankcase 20, the sensing bellows 64 will not be caused to collapse and the light 84 will remain on.

After the operation, which takes a few seconds to perform, the button 84 may be released, opening the electrical circuit. The spring 32 forces the piston 30 out of the solenoid 28 and returns the suction bellows 38 to its original position ready for the next texting procedure.

It will be immediately apparent that the light bulb 86 is off when the oil is at a proper level and on when there is an insufficient amount of oil. In the alternative, the bulb 86 may be connected so as to light when there is a sufficient amount of oil and to otherwise be off. This may be accomplished, for example, by connecting the bulb 86 across the cap 68 contacts and sensing screw 84, so that when the contact between the screw 84 and cap 68 opens, due to a sufficient amount of oil, the bulb 86 will light. At all other times, the contact between the screw 84 and cap 68 electrically short out the bulb 86. Still another alternate consideration is the use of a delay circuit which may be placed in parallel with the bulb 86. Such delay circuit, which is well known in the art, delays the lighting of the bulb 86 for a period of time so that the sensing function may be fully completed before lighting or turning off the bulb 86.

The screw 84 and cap 68 provide a convenient sensitivity adjustment for such variables as bellows wear, aging of parts, or the like. The entire hydraulic assemblage is shielded from the electrical circuit so that oil vapors cannot be ignited by a spark from the contacts 68 and 84. While this device is preferably intended for use in connection with the crankcase of a motor vehicle, it has obvious other applications to remote measurements of other liquids.

It is preferred that the sampling hole be placed at a point corresponding to the marking of the minimum oil level. While the operation of this sampling device 10 is clearly subject to the level of the oil at the sampling hole 24, the overall effect of changes in oil level are substantially reduced, as compared to float devices.

What is claimed is:

1. A device for indicating the presence or absence of a liquid in a vessel, the vessel being of the type used as a crankcase for an automobile or the like, said device comprising:
   (a) a device housing;
   (b) a tube for sampling liquid;
   (c) a first hollow chamber housing coupled to said sampling tube; said first chamber housing comprises flexible chamber walls such that the volume of said first chamber may be selectively expanded or contracted; upon expansion of said first chamber housing volume a suction is created in said sampling tube so as to enable said tube to sample the liquid;
   (d) a second chamber housing coupled to said sampling tube; said second chamber housing comprises flexible walls such that second chamber walls are capable of moving in response to the absence of the liquid in said tube upon said creation of said suction;
   (e) means for expanding or contracting said first chamber volume; and
   (f) means responsive to said movement of said second chamber housing to indicate the absence of sampled liquid in said tube; said responsive means comprises an electrical circuit; said electrical circuit comprises a pair of engageable electrical contacts and indicating means; said indicating means are coupled to said contacts for indicating whether said electrical contacts are engaged; one of said contacts being secured to said second housing chamber, said other contact being secured to said device housing such that said movement of said second housing chamber thereby causes said contacts to engage or disengage.

2. A device as recited in claim 1 wherein said expanding or contracting means comprises a solenoid secured to said first chamber housing.

3. A device as recited in claim 2 wherein said electrical circuit further comprises said solenoid being coupled to said indicating means such that upon said circuit causing said solenoid to operate said indicating being simultaneously enable to indicate the presence or absence of the liquid in said sampling tube.

4. A device as recited in claim 3 wherein said first and second chambers comprises bellows, said first chamber having a larger volume than said second chamber; said solenoid being secured to one end of said first chamber; said first chamber having a single port at the end opposed to said solenoid; said device further comprises a first hollow conduit interconnecting said first chamber with said tube; a T-connection within said conduit and a second hollow conduit; said second chamber having a single port; and a second conduit coupling said second chamber to said first conduit; said tube having an aperture spaced from the end so that the sampled liquid must be above said aperture so as to be sampled; said bellows, conduits, and tubes being non-conductive and enclosing the liquid so as to shield the liquid from said electrical circuit.

5. A device as recited in claims 3 or 4 wherein said electrical circuit comprises a normally open push button for coupling a source of electrical energy to said solenoid; said electrical contacts being coupled in series with said solenoid; a bulb coupled in series with said contacts and to said push button to complete said electrical circuit and such that upon closing said push button said solenoid expands said first chamber volume; upon liquid being sampled said second chamber volume is contracted thereby causing said chamber contact to move and provide said indication of the sampled liquid in said tube.

* * * * *